No. 830,934. PATENTED SEPT. 11, 1906.
R. A. SLIGH.
COTTON CHOPPER.
APPLICATION FILED DEC. 16, 1905.
Fig. 1.
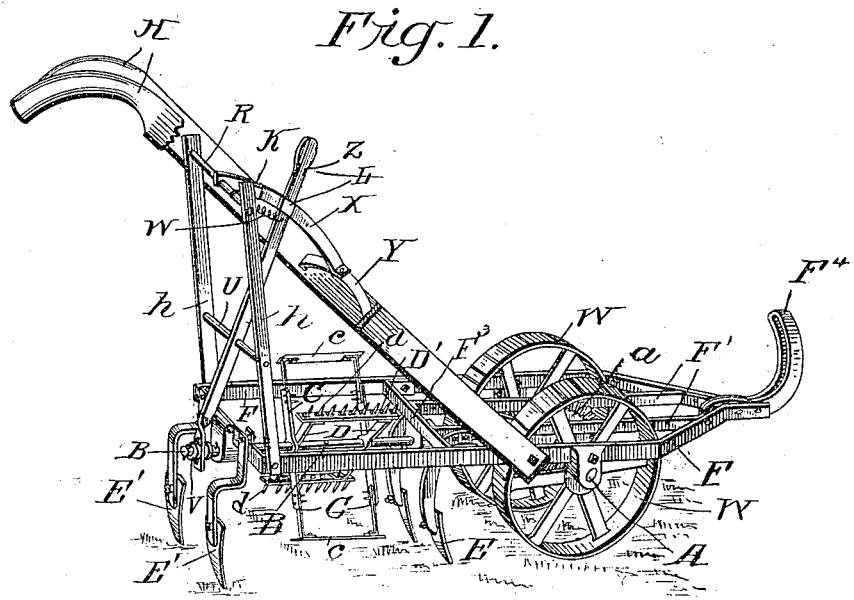
Fig. 3.
Fig. 2.
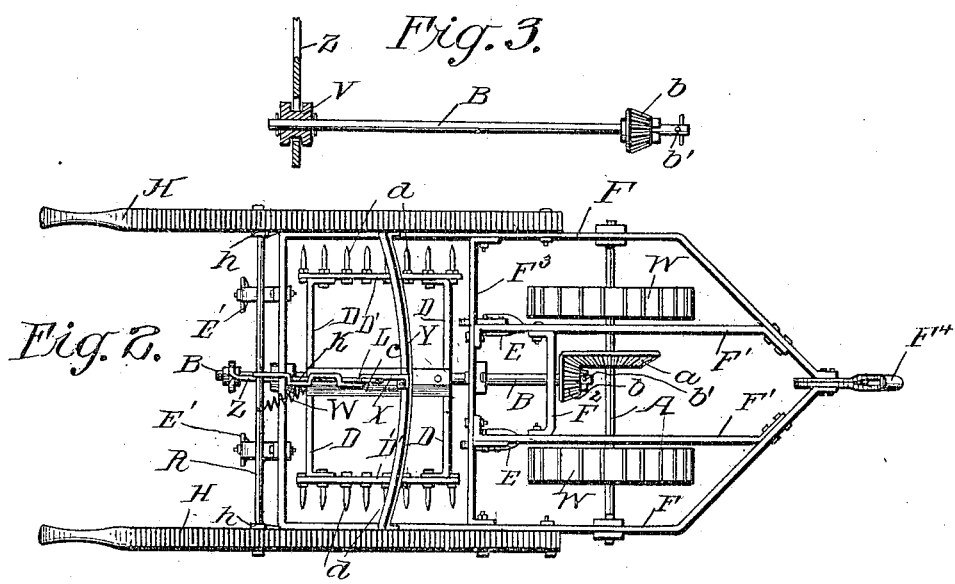
WITNESSES:
Samuel E. Wade
Edw. W. Byrn
INVENTOR
RUFUS A. SLIGH.
BY Munn & Co.
ATTORNEYS

UNITED STATES PATENT OFFICE.

RUFUS A. SLIGH, OF SLIGHS, SOUTH CAROLINA.

COTTON-CHOPPER.

No. 830,934.

Specification of Letters Patent.

Patented Sept. 11, 1906.

Application filed December 16, 1905. Serial No. 291,995.

*To all whom it may concern:*

Be it known that I, RUFUS A. SLIGH, a citizen of the United States, residing at Slighs, in the county of Newberry and State of South Carolina, have invented a new and useful Improvement in Cotton-Choppers, of which the following is a specification.

My invention relates to cotton-choppers of that type in which a longitudinally-arranged shaft is rotated through bevel-gears by running wheels, and said shaft is provided with revolving hoes or cutting-blades that chop transversely across the row of cotton-plants to properly thin the same.

My invention consists in the special construction and arrangement of this revolving member which is provided with cutting-blades and alternating harrow-teeth for the purpose hereinafter described.

It also consists in the special construction and arrangement of adjusting devices as hereinafter described with reference to the drawings, in which—

Figure 1 is a perspective view of my improved cotton-chopper, partly broken away; Fig. 2, a plan view, and Fig. 3 is a detail.

In the drawings, F F represent an outer framework composed of iron bars whose sides are parallel and whose front ends are arranged convergently and connected to an upturned draft attachment $F^4$. The side bars at their rear ends are connected to or formed integrally with a cross-bar. Between the side bars are arranged two other parallel longitudinally-arranged bars F' F', which at their forward ends are secured to the convergent front ends of the frame F and at their rear ends are connected to a cross-bar $F^3$, connected at its ends to the two outer side bars of the frame F. A short cross-bar $F^2$ connects the two inner side bars F' F'. In the front part of the main frame, as thus constructed, is arranged in bearings the transverse drive-shaft A, having running wheels W W, which travel on the ground and rotate the shaft. Between the bars F' F' this shaft has a rigidly-attached bevel gear-wheel $a$, which meshes with a small bevel gear-wheel $b$ on the forward end of a longitudinally-arranged shaft B, journaled in bearings in the cross-bars $F^2$ $F^3$ and the rear cross-bar of the frame F.

On the longitudinal shaft B are secured the cotton chopping and harrowing devices. The cotton-chopping devices consist of pairs of radial arms C, rigidly fixed to the shaft and connected at their outer ends by blades $c$, arranged longitudinally to the line of draft. These blades have shanks at the ends that are detachably and adjustably bolted to the arms C. Alternating with the chopper-arms C are the other radial arms D, which at their outer ends are connected by a longitudinally-arranged bar D', perforated to receive harrow-teeth $d$, which latter are adjustable and detachable in said holes by means of suitable nuts.

To the main frame F are connected handles H H, which near their ends are connected to the rear portion of the frame by standards $h$ $h$ and are connected to each other by a cross-bar R.

E E' are cultivator-shovels, which are connected to the main frame in front and rear of the chopping devices.

I am aware that it is not new to operate chopping devices cutting transversely to the row by means of a shaft connected in front to and driven by bevel-gears deriving motion from a transverse shaft bearing running wheels, and I do not claim this as my invention. I would state that the harrowing devices arranged alternately with the chopping-blades enable me to chop out a given section of plants and harrow the section left. In other words, the cotton is thinned and harrowed at the same time. These harrow-teeth may also be set so as to serve the purpose of throwing out of the row ahead of the chopping-blades all stones and heavy clods which would be liable to injure or prevent the proper action of the blades. Furthermore, the detachable character of the harrow-teeth and chopping-blades permit either of them to be used alone, if desired. It will be understood that any number of harrow-teeth may be removed to suit the character of the work. The cultivator-teeth E E' also cultivate and hill up the row as the machine passes along.

To permit the chopping and harrowing devices to be thrown in or out of gear, a lever Z is fulcrumed on a bar U between the uprights for the handles. The lower end of this lever is slotted or forked and embraces a spool or grooved collar V, which swivels loosely on the rear end of the chopper-shaft B, as seen in Fig. 3. This spool is by means of pins or flanges on the shaft B prevented from moving longitudinally on the shaft. The forward end of the shaft B is provided with a rigidly-attached clutch member in the form of crosspins $b'$, which are adapted to drop into corresponding clutch-seats in the forward end of the hub of bevel-pinion $b$ when shaft B is drawn to the rear, thus locking the pinion $b$ and shaft B together for the rotation of the chopping devices. When, however, the shaft B is moved forward, the clutch-pins $b'$ leave the pinion $b$, as seen in Fig. 3, and then the pinion $b$, which is always in mesh with $a$, runs freely on the shaft B without turning it. The shaft B is moved backward and forward by the lever Z, whose upper end is guided and held by an arch-bar X, having seats K and L to receive the lever and hold it in its two positions. The arch-bar X is held at one end by a cross-rod R between the handles and at the other end by a cross-bar Y between the handles at a point lower down. The lever Z is held in its seats K or L by means of a spring W. To vary the speed and time of action of the chopping and harrowing devices, the bevel-gears $a$ and $b$ may be made in sets of different relative sizes.

Having thus described my invention, what I claim as new, and desire to secure by Letters Patent, is—

1. A cotton-chopper, comprising a transversely-arranged driving-shaft with bevel-gear, a horizontal longitudinally-arranged and longitudinally-adjustable shaft bearing revolving cutters and having at its forward end a loose bevel-gear permanently engaged with the bevel-gear of the transverse shaft, and having a clutch-face, a clutch member rigidly connected to the shaft and adapted to lock or unlock the bevel-gear and the shaft by a longitudinal movement of the shaft and means connecting with the shaft in rear of the cutters for adjusting the shaft and cutters bodily and together.

2. A cotton-chopper comprising a transversely-arranged driving-shaft with bevel-gear, a horizontal longitudinally-arranged and longitudinally-adjustable shaft bearing revolving cutters and having at its front end a rigid clutch member, a loose bevel gear-wheel on said shaft permanently engaged with the gear of the transverse shaft and having a clutch-face fitting the clutch member of the shaft, said clutch being operable by the longitudinal movement of the shaft, and a lever arranged between the rear portion of the handles and having a swiveling connection with the rear end of the cutter-shaft behind the cutters.

3. A cotton-chopper comprising a transversely-arranged driving shaft with bevel-gear, a horizontal longitudinally-arranged and longitudinally-adjustable shaft bearing revolving cutters and having at its front end a rigid clutch member, a loose bevel gear-wheel on said shaft permanently engaged with the bevel-gear of the transverse shaft and having a clutch-face fitting the clutch member of the shaft, an upright lever fulcrumed in the framework and having at its lower end a swiveling connection with the rear end of the cutter-shaft and behind the cutters, two cross-bars between the handles, an arch-bar supported by the two cross-bars and locking devices for holding the lever to its adjustment on the arch-bar.

4. A cotton-chopper, consisting of a frame, a longitudinally-arranged shaft with suitable driving mechanism, pairs of radial arms fixed to said shaft, a longitudinally-arranged cutting-blade having shanks adjustably attached to the outer ends of one pair of arms and a longitudinally-arranged bar fixed to the alternating pair of arms and provided with detachable harrow-teeth and nuts for securing them in the bar.

RUFUS A. SLIGH.

Witnesses:
L. Q. FULLERS,
F. W. HIGGINS.